United States Patent [19]

Uchida et al.

[11] 4,435,765
[45] Mar. 6, 1984

[54] BANK INTERLEAVED VECTOR PROCESSOR HAVING A FIXED RELATIONSHIP BETWEEN START TIMING SIGNALS

[75] Inventors: Keiichiro Uchida, Yokohama; Hiroshi Tamura, Kawasaki; Tetsuro Okamoto, Machida; Shigeaki Okutani, Yokohama, all of Japan

[73] Assignee: Fujitsu Limited, Kawasaki, Japan

[21] Appl. No.: 322,717

[22] Filed: Nov. 18, 1981

[30] Foreign Application Priority Data

Nov. 21, 1980 [JP] Japan .................................. 55-164100
Nov. 26, 1980 [JP] Japan .................................. 55-166164

[51] Int. Cl.$^3$ .............................................. G06F 9/18
[52] U.S. Cl. .............................................. 364/200
[58] Field of Search .................. 364/200, 900, 300

[56] References Cited

U.S. PATENT DOCUMENTS

| | | | |
|---|---|---|---|
| 3,812,473 | 5/1974 | Tucker ................................. | 364/200 |
| 3,827,031 | 7/1974 | Kastner et al. ...................... | 364/200 |
| 4,128,880 | 12/1978 | Cray ................................... | 364/200 |
| 4,185,323 | 1/1980 | Johnson et al. .................... | 365/222 |
| 4,344,131 | 8/1982 | Girard ................................. | 364/200 |

OTHER PUBLICATIONS

Communications of the ACM vol. 21, No. 1, 1/78, pp. 63–72, "The Cray 1 Computer System".
Principles of Digital Computer Design, Meltzer et al., p. 201.

Primary Examiner—Jerry Smith
Assistant Examiner—Jameson Lee
Attorney, Agent, or Firm—Staas & Halsey

[57] ABSTRACT

The present invention discloses a data processing system where a plurality of vector registers consisting of plurality of elements are provided between a main memory unit and an operational processing unit, the desired data is transferred to the vector registers from the main memory unit and is held therein, and various processings such as a logical operation are carried out by sequentially accessing the elements within said vector registers. The present invention also includes a plurality of memory banks which can be independently accessed and are provided for the vector registers. A series of elements of each vector register are interleaved in the plurality of memory banks and the elements having the same numbering in each vector register are arranged in the same memory bank. Timing necessary for starting access to a series of elements of said vector registers are specified for each class of processing, so that the vector operation processings can be done very effectively and without operand collision.

9 Claims, 19 Drawing Figures

VECTOR ADD

○ : VR1
△ : VR2
□ : VR3

VR3 ← VR1+VR2

BANK INTERLEAVED VECTOR PROCESSOR HAVING A FIXED RELATIONSHIP BETWEEN START TIMING SIGNALS

BACKGROUND OF THE INVENTION

1. Field of the Invention

The present invention relates to a data processing system, particularly to a data processing system which provides a plurality of vector registers comprising a plurality of elements between a main memory unit and an operational unit, transfers desired data to said vector registers from the main memory unit and holds it therein, and carries out various processings such as logical operations by sequentially accessing the elements in said vector registers.

2. Description of the Prior Art

In a data processing system where data of a main memory unit is usually buffered to a plurality of vector registers consisting of plurality of elements and where operations such as logical operation are carried out by extracting the data from said vector register, the vector registers are arranged in units of a bank where a plurality of banks are used and arithmethic operations are performed by sequentially addressing a continuous data element in the same bank unit.

As a typical example of the data processing system employing such a system, the CRAY-1 Computer System described in the magazine "Communications of the ACM" Volume 21, Number 1, 1978, PP63-72 is generally known. However, according to the existing system, when the bank storing the data, which is considered the object of operation, is once started to be used for a vector operation etc., such bank becomes busy for a long period. The bank remains busy until the operations for the series of a plurality of data elements of the vector operation is finished, and as a result, the elements in the other addresses in the same bank can no longer be used.

On the page 66 of the ACM article previously mentioned, a structure where a total of eight vector registers from V0 to V7 are arranged is disclosed.

In this existing system, for example, when an instruction, "add the contents of vector registers V0 and V1 and store an result to the vector register V2" and the instruction, "multiply the data obtained as a result of addition being stored in the vector register V2 and the content of vector register V3 and then store the result to the vector register V4" are issued, after the data element obtained as the result of first addition is stored in the vector register V2, the contents of the pertinent vector register V2 is sequentially considered as the object of operation for the succeeding multiplication instructions. However, since the vector register V2 continuously stores the data obtained as the result of addition, it does not become idle until the data indicating the result of the final addition is stored. Therefore, even when the data considered as the object of operation exists within the vector register V2, the succeeding multiplication instructions cannot use it, except for only one case where the succeeding multiplication instructions are issued with a timing such that the data obtained as the result of the first addition by the preceding addition instruction is output from an adder circuit. In such a case, the succeeding multiplication instructions can be executed in parallel with the execution of the addition instruction by extracting the data to be stored in to the vector register V2 from the adder circuit through a bypass route. But, this case is an exceptional operation where the succeeding instruction happens to be issued at the one limited timing. Usually, instructions are issued at a random timing and the succeeding instructions are, in general, queued until the operations for a preceding instruction for the same bank terminates.

The above-discussed system brings about a result such that not only the average instruction execution time of a vector instruction becomes long but also the effective degree of use of the vector registers can be reduced drastically, and in addition the amount of data that can be accommodated in the vector register is also reduced.

SUMMARY OF THE INVENTION

It is an object of the present invention to provide a data processing system which effectively uses the vector registers and processes, using a fixed start signal relationship, parallel data continuously for a plurality of access request made by a plurality of logical operators.

For this purpose, the present invention discloses a data processing system which provides a plurality of vector registers comprising a plurality of elements between a main memory unit and an operational unit. The system transfers the desired data to said vector registers from the main memory unit and holds it therein, and carries out various processing operations such as logical operations by sequentially accessing the elements in said vector registers. The system also includes a plurality of memory banks which can be independently accessed and which are provided for said vector registers. A series of elements of each vector register are interleaved between said plurality of memory banks, and the elements having the same numbering in each vector register are arranged in the same memory bank. Timing necessary for starting the access to a series of elements is specified for each kind of processing.

BRIEF DESCRIPTION OF THE DRAWINGS

FIG. 12 (a) and FIG. 12 (b) illustrate detailed structures of write gate circuits for the vector register.

FIG. 13 (a) and FIG. 13 (b) illustrate detailed structures of read gate circuits for the vector register.

FIG. 14 (a) and FIG. 14 (b) illustrate timing charts of logical operations.

DESCRIPTION OF THE PREFERRED EMBODIMENTS

Figure 1:
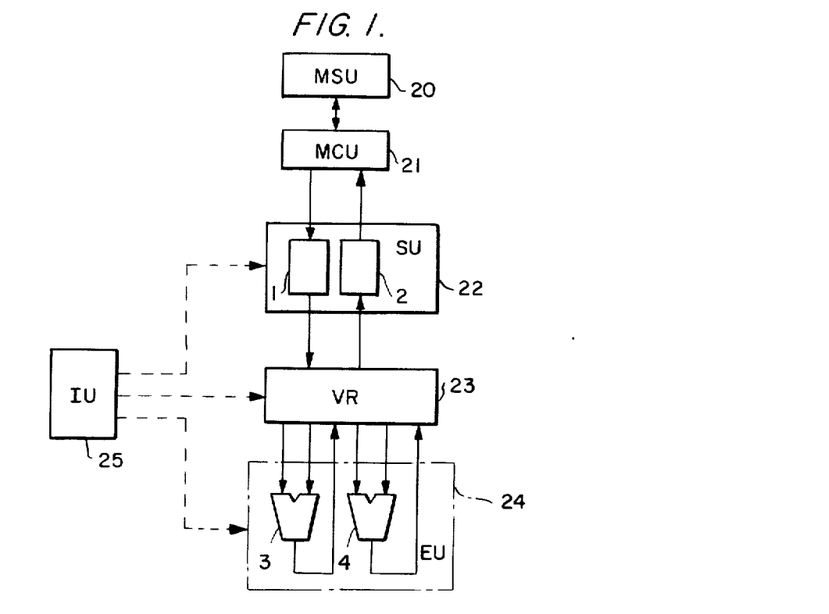
FIG. 1 is a block diagram illustrating a part of structure of a data processing system for a preferred embodiment of the present invention.

A preferred embodiment of the present invention will be explained in detail by referring to the drawings. In FIG. 1, 1 is a loading processor; 2 is a storing processor; 3 is an adder; 4 is a multiplier; 20 is a main memory unit MSU; 21 is a main memory control unit MCU; 22 is a memory control unit SU; 23 is a vector register VR; 24 is an operation unit EU; and 25 is an instruction control unit IU.

In FIG. 1, the data from main memory unit MSU is read by the main memory control unit MCU 21 and input to the loading processor 1, according to an instruction sent from the instruction control unit IU 25. The loading processor 1 stores the data in the vector register VR 23. The data stored in the vector register VR 23 is read, and added, for example, by the adder 3, and the result of such addition is stored again into the vector register VR 23. The processed contents of vector register VR 23 passes to the storing processor 2 and is returned to the main memory unit MSU 20 under the control of the main memory control unit MCU 21. The operations of the memory control unit SU 22, vector register VR 23 and operation unit EU 24 are respectively controlled by the instruction control unit IU 25.

Figure 2:
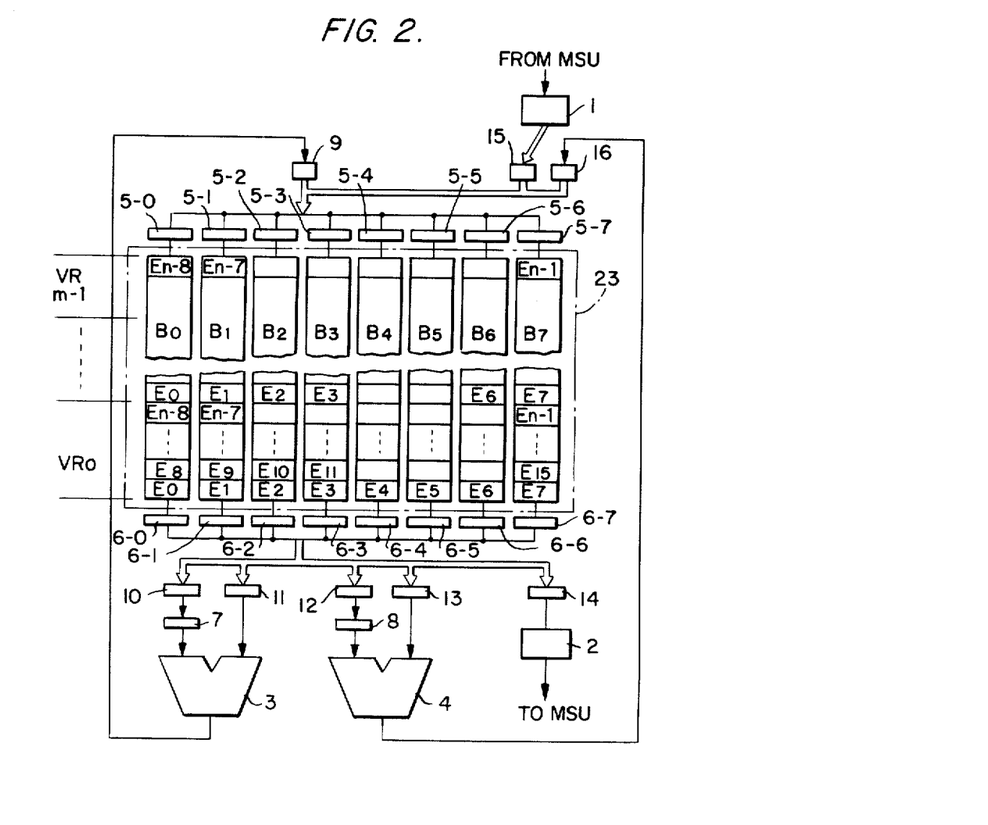
FIG. 2 is a block diagram of a principal part of the embodiment.

FIG. 2 is a block diagram mainly indicating element layout of the vector register VR 23. The portions given the same numbering as those of FIG. 1 show the same portion. 5-0 to 5-7, 6-0 to 6-7, 7, 8 are registers, while 9 to 16 are ports (registers). A memory bank for the vector register comprises eight (8) banks of B0 to B7, a total of m vector registers VR from $VR_0$ to $VR_{m-1}$ enclosed by a dash-dot line are used, and these registers are divided and arranged in each bank in a direction from the bank B0 to B7. Moreover, the elements $E_0$ to $E_{n-1}$ of the vector registers $VR_0$ to $VR_{m-1}$ are sequentially interleaved in the same direction from the bank B0 to B7. Namely, the elements $E_0$, $E_8$, ..., $E_{n-8}$ are arranged in the bank $B_0$ in the vector registers $VR_0$ to $VR_{m-1}$, while the elements $E_1$, $E_9$, ..., $E_{n-7}$ are in the bank $B_1$. In the same way, the elements $E_7$, $E_{15}$, ..., $E_{n-1}$ are arranged in the bank $B_7$.

In the case of the embodiment, four kinds of processing units; the loading processor 1, the storing processor 2, the adder 3 and the multiplier 4 make access to the vector register VR 23.

Figure 6:
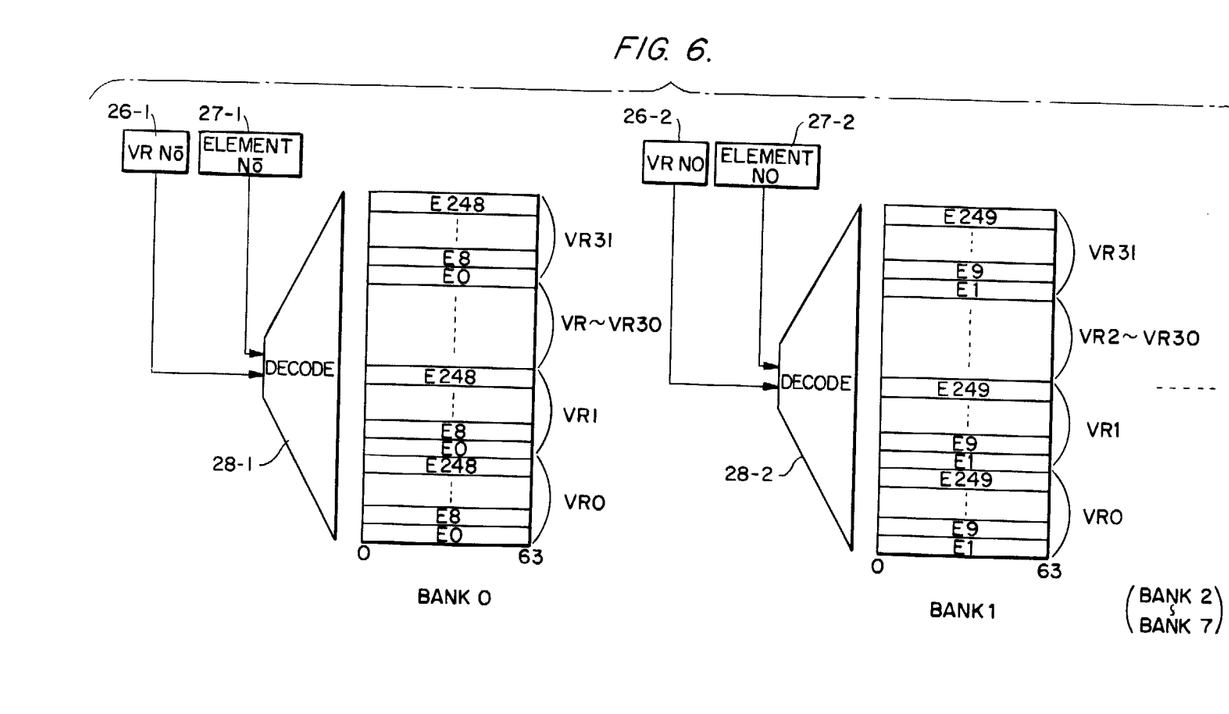
FIG. 6 illustrates a more detailed structure of a vector register.

FIG. 6 shows the detailed structure of the vector register VR 23 with respect to bank 0 and bank 1. In this figure, 26-1 and 26-2 are vector number registers; 27-1 and 27-2 are element number registers; and 28-1 and 28-2 are address decoding circuits. Each element is composed of 64 bits, each vector register is composed of 256 elements and a total of 32 vector registers are used. In addition the final element #255 is stored in the bank 7 which is not illustrated.

Figure 7:
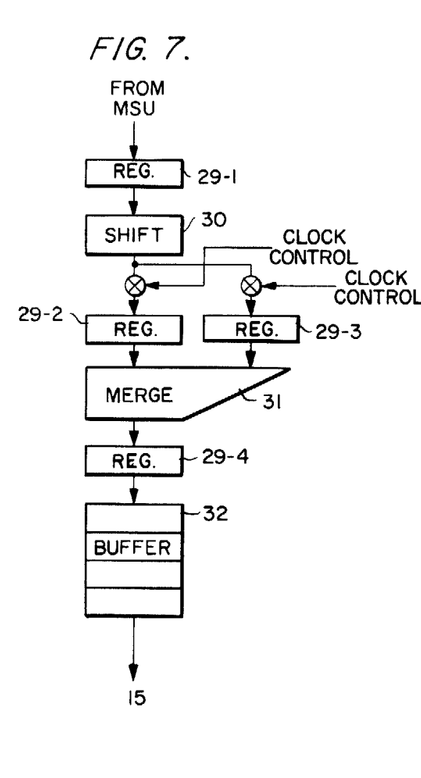
FIG. 7 illustrates a more detailed structure of a loading processor.

FIG. 7 shows the detailed structure of the loading processor 1. In this figure, 29-1 to 29-4 are registers; 30 is a shift circuit; and 31 is a merge circuit; 32 is a buffer circuit.

Figure 8:
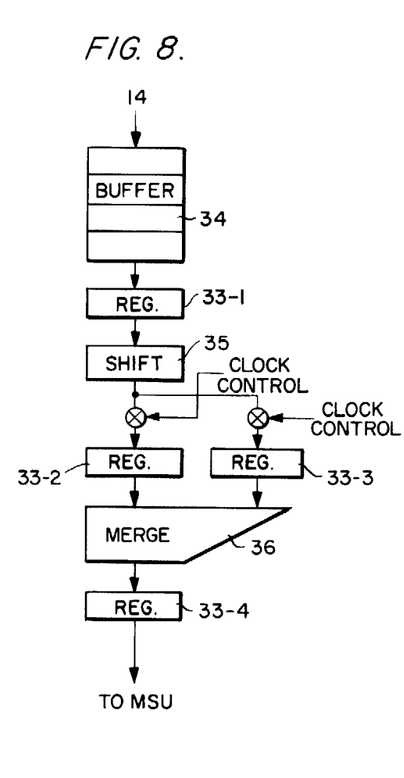
FIG. 8 illustrates a more detailed structure of a storing processor.

FIG. 8 shows the detailed structure of the storing processor 2. In this figure, 33-1 to 33-4 are registers; 34 is a buffer circuit; and 35 is a shift circuit; 36 is a merge circuit.

Figure 9:
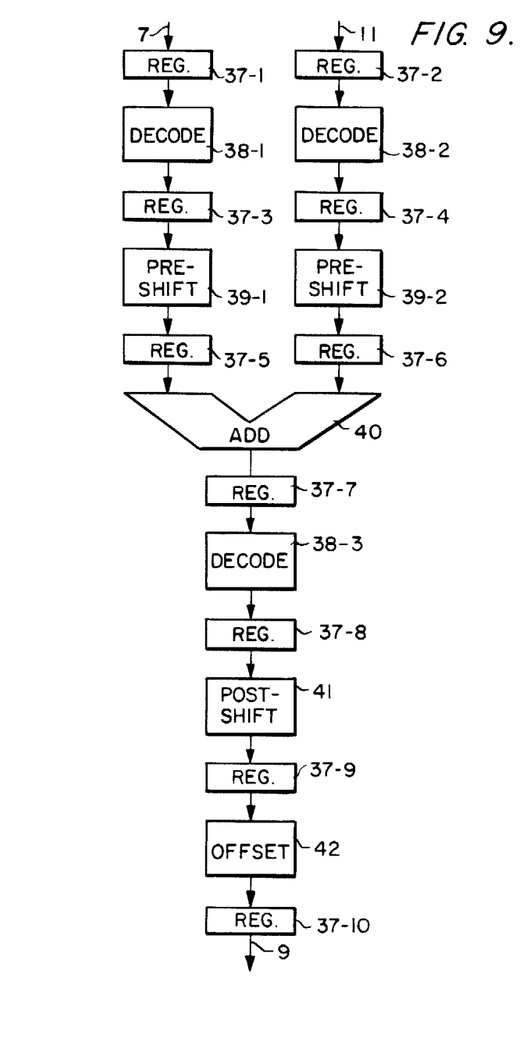
FIG. 9 illustrates a more detailed structure of an adder.

FIG. 9 shows the detailed structure of the adder 3. In this figure, 37-1 to 37-10 are registers; 38-1 to 38-3 are decoders; 39-1 to 39-2 are preshift circuits; 40 is an adder; 41 is a post shift circuit; and 42 is an off-set circuit.

Figure 10:
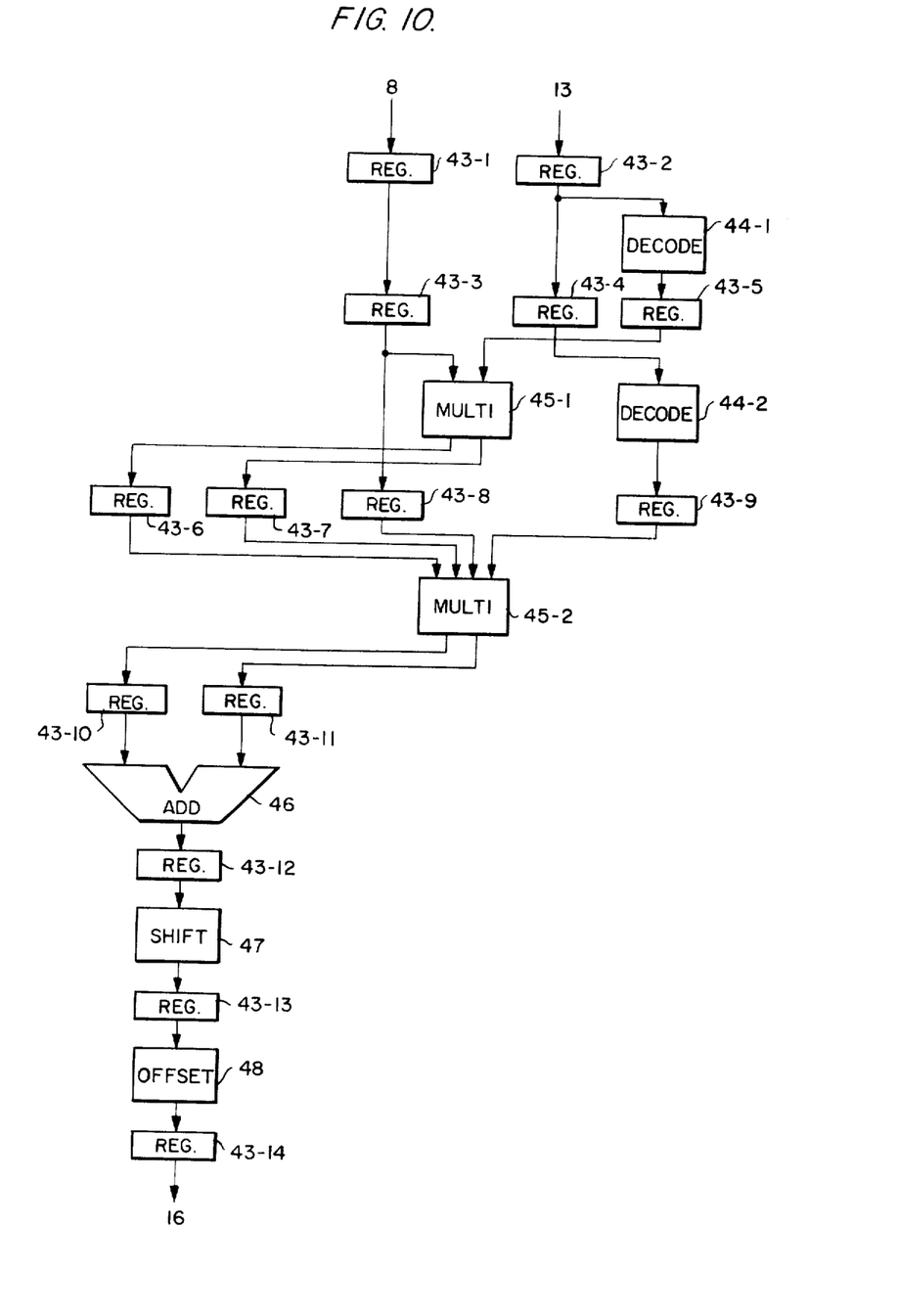
FIG. 10 illustrates a more detailed structure of a multiplier.

FIG. 10 shows the detailed structure of the multiplier 4. In this figure, 43-1 to 43-14 are registers; 44-1 to 44-2 are decoders; 45-1 to 45-2 are multipliers; 46 is an adder; 47 is a shift circuit; and 48 is an off-set circuit.

In FIG. 7 to FIG. 10, the numerals given to the input lines extended from upper side and those given to the output lines extended toward lower lines correspond to the same numbered components in FIG. 2.

The circuit structures shown in FIG. 7 to FIG. 10 are well known, although they are modified a little according to the system adopted and the operating description of them is omitted here. However, it should be noted that all processing portions shown in FIG. 7 to FIG. 10 employ the pipe line structure. Succeedingly, the addition instruction processing in the embodiment will be explained using the timing chart in FIG. 3.

Figure 3:
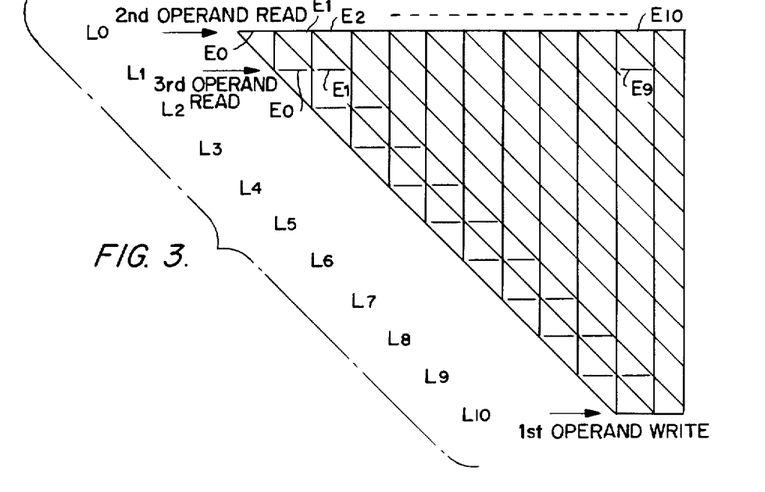
FIG. 3 is a timing chart of an adding operation.

If the addition is executed, for example, in each processing stage of level 11 (L0 to L10), the elements $E_0$, $E_1$, $E_2$, ..., $E_{10}$, ... of the designated vector register are read sequentially as an operand since this system employs the pipeline structure. Here, one input of the adder is considered as a 2nd operand, while another input of the adder as a 3rd operand and the adder output is considered as a 1st operand. As an example, the operations where VR0 becomes the 2nd operand, while the VR1 becomes the 3rd operand and VR2 becomes the 1st operand, namely VR2←VR0+VR1 is executed.

In FIG. 3, when a readout operation starts at a certain timing $T_0$, the element $E_0$ of bank $B_0$ of the 2nd operand VR0 is sent to the port 10. At the next timing $T_1$, the element $E_1$ of bank $B_1$ of the 2nd operand VR0 is sent to the port 10 and simultaneously the element $E_0$ of bank $B_0$ of the 3rd operand VR1 is sent to the port 11. At the time $T_1$, the element $E_0$ of VR0 being held at the port 10 preceeding as the time $T_1$ is shifted to the register 7. Thereby, the situation is ready for addition of elements $E_0$ of the VR0 and VR1. A couple of elements $E_0$ are input to the adder 3. Moreover, at the next time $T_2$, the element $E_2$ of bank $B_2$ of VR0 is sent to the port 10 and simultaneously the element $E_1$ of bank $B_1$ of VR1 is sent to the port 11. Succeedingly at the time $T_3$ to $T_{10}$, the readout processing is sequentially carried out in the same way. At the time $T_{10}$, the element $E_{10}$ of bank $B_2$ of VR0 is sent to the port 10 and the element $E_9$ of bank $B_1$ of VR1 is sent to the port 11. On the other hand, at the time $T_{10}$, the result of addition of the element $E_0$ of VR0 and the element $E_0$ of VR1 is written into the element $E_0$ of bank $B_0$ of the 1st operand VR2 by the port 9. After the time $T_{10}$, results of additions are output continuously and sequentially written into the corresponding element position of VR2.

Figure 4:
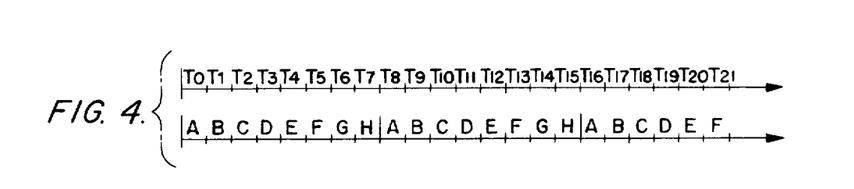
FIG. 4 illustrates operation timings of the embodiment.

When the processing is carried out as explained above, the processing by multiplier 4 can no longer be started at least during the period from $T_0$ to $T_2$ if the processing of adder 3 is started from the time $T_0$. Namely, a control circuit which controls the banks already used and selects the banks to be used by the succeeding instructions is required. As shown in FIG. 4, the embodiment of the present invention gives the letters A to H to the times $T_0$ to $T_7$, $T_8$ to $T_{15}$, $T_{16}$ to $T_{23}$, ... divided for the number of operands required. In other words 8 time periods (3 for adder, 3 for multiplier, 1 for loading processor and 1 for storing processor) are needed for solving such problem, and as indicated below the timing for starting the application of processors for each access is specified for each 8-period cycle.

Namely, (1) At the timing A, access to the one input (2nd operand) of the adder 3 or multiplier 4 is started, (2) At the timing B, access to the other input (3rd operand) of the adder 3 or multiplier 4 is started, (3) At the timing C, access to the output (1st operand) of the adder 3 or multiplier 4 is started, (4) At the timing D, access to the one input (2nd operand) of the multiplier 4 or adder 3 is started, (5) At the timing E, access to the other input (3rd operand) of the other input of multiplier 4 or adder 3 is started, (6) At the timing F, access to the output (2nd operand) of the multiplier 4 or adder 3 is started, (7) At the timing G, access to operand of the loading processor 1 (or storing processor 2) is started, (8) At the timing H, access to the operand of the storing processor 2 (or loading processor 1) is started.

This designation is only an example and any timing where simultaneous accesses are avoided can be used. Thereby, the timings A, B and C becomes the timing periods for starting addition or multiplication during the eight cycles, while the timings D, E and F becomes the timing periods for starting multiplication or addition.

Figure 5:
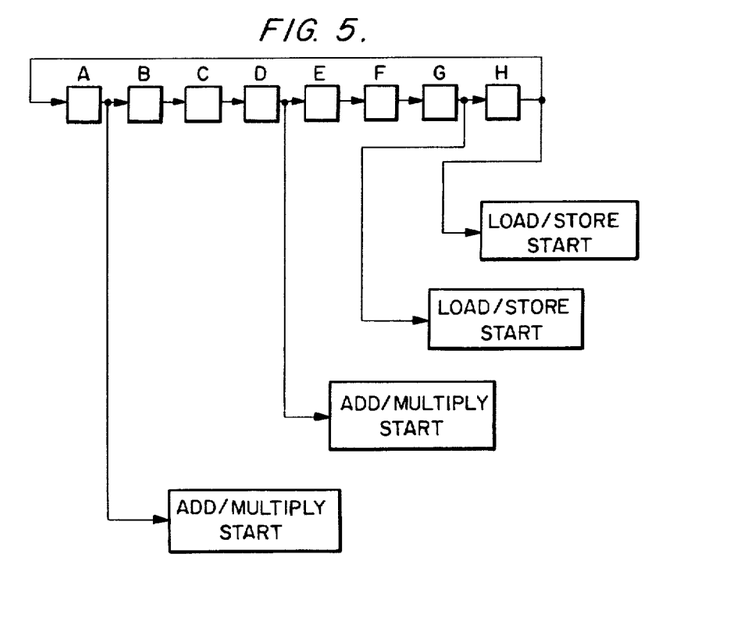
FIG. 5 illustrates bank access start timing.

FIG. 5 explains the concept of the above-mentioned bank access start timing. In this figure, A to H are flip-flops comprising a shift register; "ADD/MULTIPLY START" and "LOAD/STORE START" are START signal generator circuits which will be explained later in detail in relation to FIG. 11.

Figure 11:
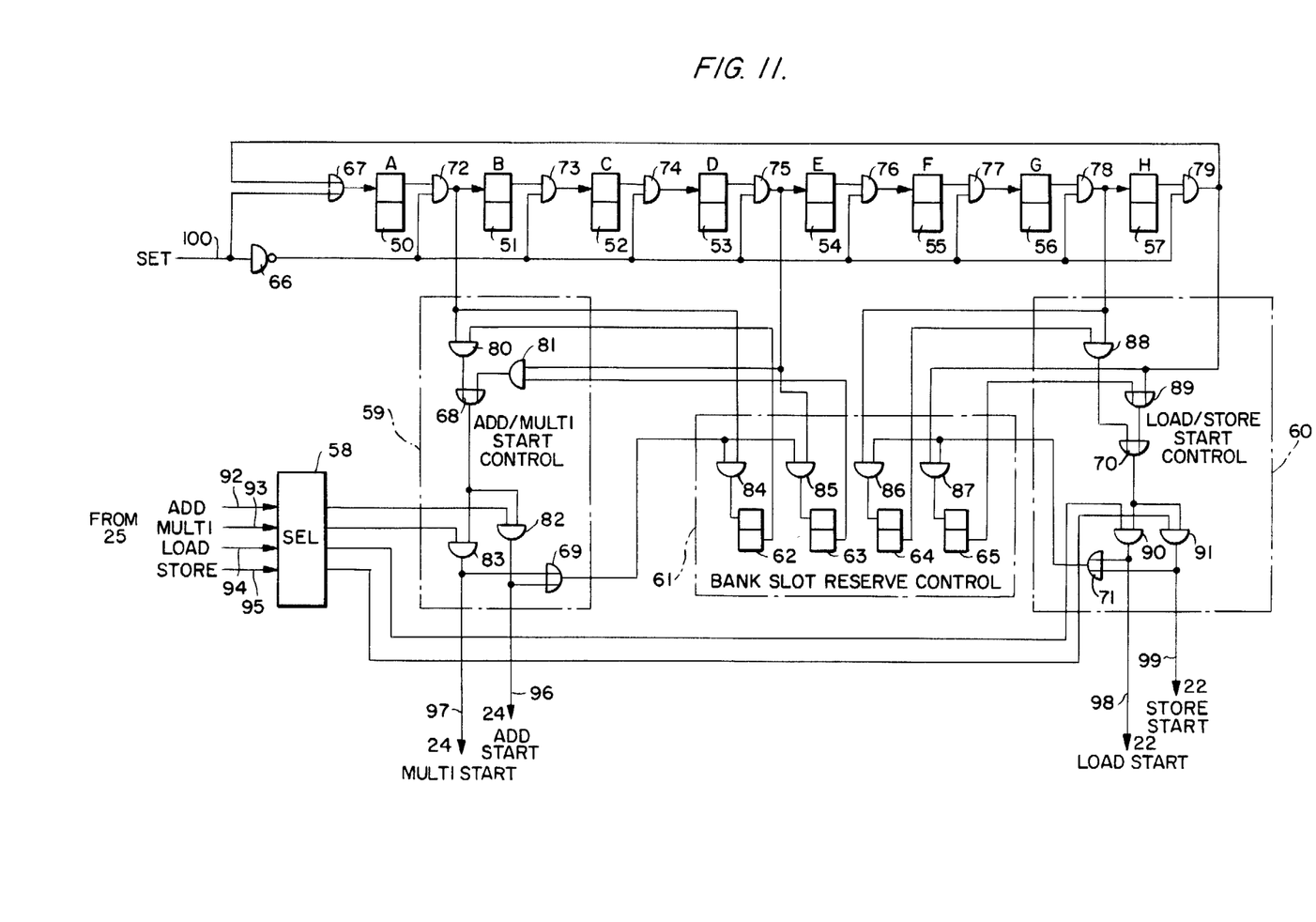
FIG. 11 illustrates a more detailed structure of an access start control circuit.

FIG. 11 shows the detailed structure of an access start control circuit which is connected to the system illustrated in FIG. 1. In this figure, 50 to 57 are flip-flops A to H for generating the timing signals; 58 is a selection circuit and is connected to the instruction control unit 25; 59 is an ADD/MULTIPLY start control circuit; 60 is a LOAD/STORE start control circuit; 61 is a bank slot reserve control circuit; 62 to 65 are flip-flops; 66 is an inverter; 67 to 71 are OR gates; 72 to 91 are AND gates; 92 is an ADD instruction signal line; 93 is a MULTIPLY instruction signal line; 94 is a LOAD instruction signal line; 95 is a STORE instruction signal line; 96 is an ADD start signal line and is connected to the operation unit 24; 97 is a MULTIPLY start signal line and is connected to the operation unit 24; 98 is a LOAD start signal line and is connected to the memory control unit 22; 99 is a STORE start signal line and is connected to the memory control unit 22; 100 is a timing flip-flop set signal line connected to a clock.

Operations of the circuit shown in FIG. 11 are explained below.

In the initial condition, the timing flip-flop set signal line SET 100 becomes "1", the flip-flop A 50 is set and other flip-flops B to H 51 to 57 are reset. Thereafter, the timing flip-flop set signal line SET 100 becomes "0", causing only one flip-flop among flip-flops A to H to become "1". Thus, the operation of the shift register is started.

When the instruction for accessing the vector register is issued under this condition, said instruction causes the selector 58 to output a selection signal and an operation access is selected by the selector circuit 58 and then the selection signal input to one of the START CONTROL circuits.

When an ADD instruction is selected, one input of AND gate 82 becomes "1". On the other hand, the flip-flops 62 to 65 in the BANK SLOT RESERVE CONTROL circuit 61 are reset in their initial condition. As a result, when, for example, the flip-flop A 50 among the flip-flop group, which is operating as the shift register, becomes "1", an output of AND gate 80 becomes "1" and the other input of AND gate 82 becomes "1" via the OR gate 68. Therefore, at this time, an output of AND gate 82 becomes "1", the ADD START signal line 96 connected to the operation unit 24 becomes "1", and start of access to the vector register by means of the selected ADD instruction is allowed. Simultaneously, since an output of AND gate 84 becomes "1", the flip-flop 62 is set and its output Q becomes "0". For this reason, the output of AND gate 80 remains "0", thereafter, even after the flip-flop A 50 becomes "1", the start of access to the vector register by means of another instruction at the timing A is not allowed.

In case the flip-flop D 53 becomes "1" before the flip-flop A 50 after said ADD instruction is selected, the output of AND gate 81 becomes "1", the ADD START signal line 96 connected to the operation unit 24 becomes "1" as in the case of the above operation and the start of access to the vector register by means of the selected ADD instruction is allowed. In this case, the flip-flop 63 is set and its output Q becomes "0". Thereafter, the output of AND gate 81 remains "0" even if the flip-flop D 53 becomes "1" and the start of access to the vector register by means of another instruction at the timing D is not allowed.

The above operations are carried out when the ADD instruction is selected, and the same operations are also carried out when the MULTIPLY instruction is selected.

If the LOAD instruction is selected, one input of AND gate 90 becomes "1". Thereafter, when any one condition among those where the flip-flop 64 is reset and the flip-flop G becomes "1" or the flip-flop 65 is reset and the flip-flop H becomes "1" is satisfied before the other condition, the output of AND gate 90 becomes "1". Thereby, the LOAD START signal line 98 connected to the loading processor 1 becomes "1" and the start of access to the vector register by means of the selected LOAD instruction is allowed. Simultaneously, the flip-flop among 64 or 65 which causes the output of AND gate 90 to become "1" is set, and the start of access to the vector register by means of another instruction at the timing corresponding to the pertinent flip-flop is not allowed.

The operations carried out when the STORE instruction is selected are the same as those carried out when said LOAD instruction is selected.

The processing of instructions for making access to the vector register is executed as explained above but when the processing of the pertinent instruction is completed, the corresponding flip-flop in the BANK SLOT RESERVE CONTROL CIRCUIT 61 is reset. Thereafter, the access start processing to the vector register can be done with the same timing by the other instructions.

Figure 14A:
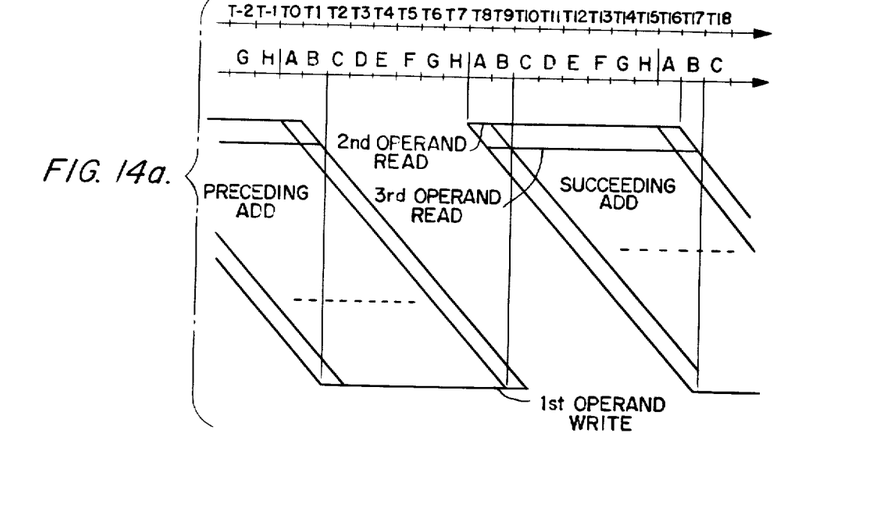
Figure 14B:
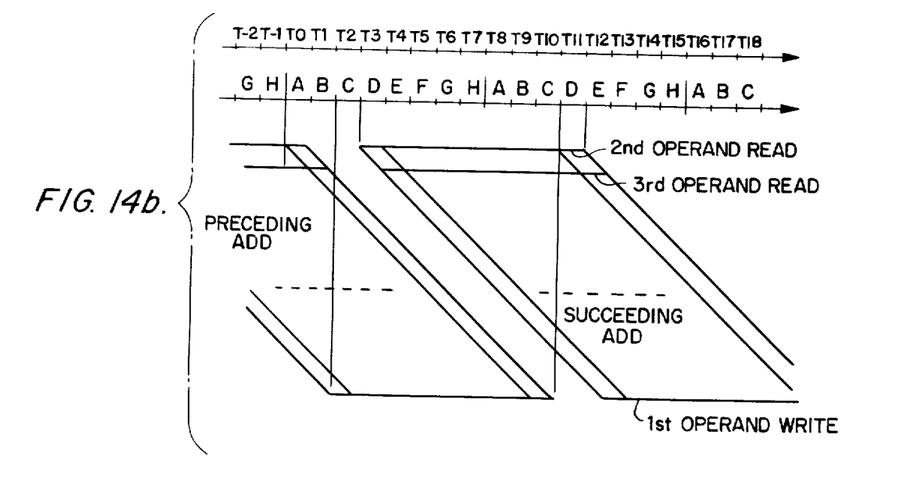

FIGS. 14 (a and b) show an example of timing of logical operations. FIG. 14 (a) shows the case where the preceding ADD instruction operation is started at the timing A and the succeeding ADD instruction operation is also started at the timing A. In this case, the timing D is already occupied by other logical operations, namely by the multiplication instruction operation which is not illustrated, and the timing D at the time T₃ cannot be used. FIG. 14 (b) shows a case where the preceding ADD instruction operation is started at the timing A and the succeeding ADD instruction operation is started at the first available idle timing, namely at the timing D.

Figure 15:
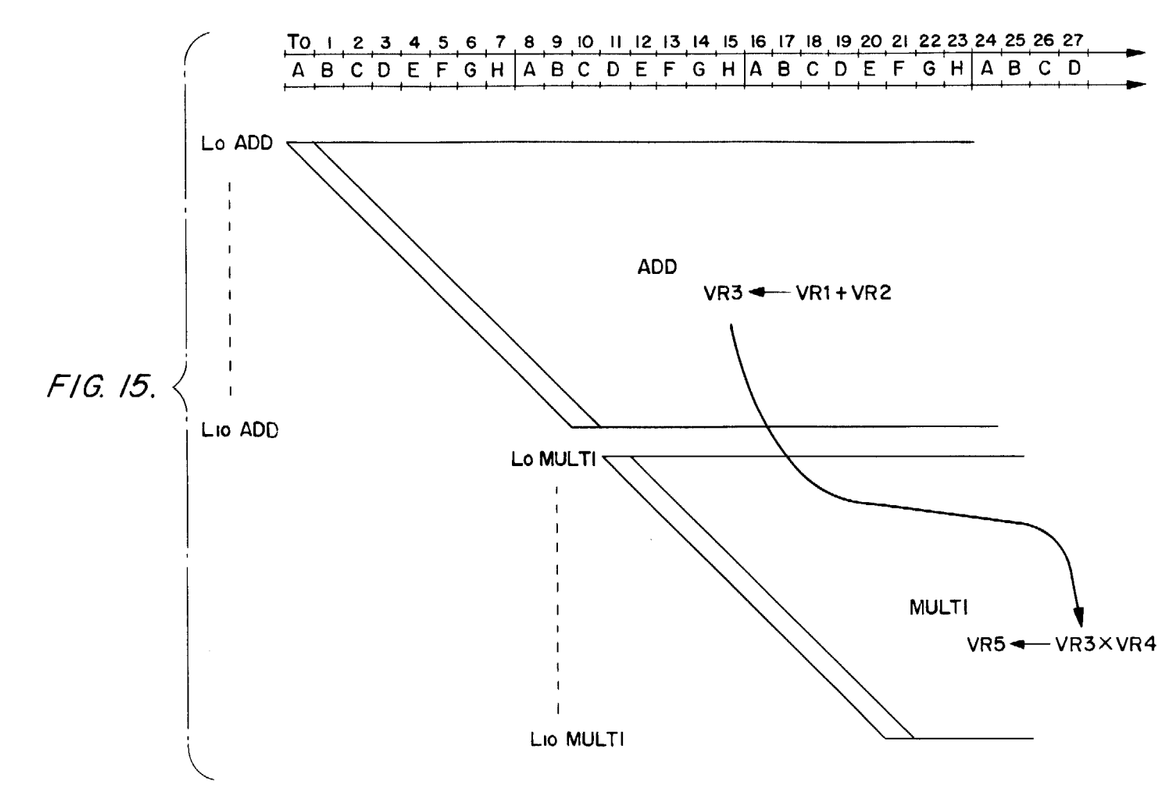
FIG. 15 illustrates the linkage between the adder operation and multiplier operation.

FIG. 15 explains an example of linkage between addition and multiplication. Namely, at first, the addition of vector register VR1 and VR2 is carried out and the result is stored in the VR3. Then, multiplication between VR3 storing the result of addition and VR4 of another vector register is carried out, and the result is stored in the vector register VR5.

In the example of FIG. 15, the preceding addition is started at the timing A and the succeeding multiplication is started at the timing D. The result of the first addition is stored into VR3 at the timing C, and therefore the succeeding multiplication can be started immediately with a delay of only one timing period.

Figure 16:
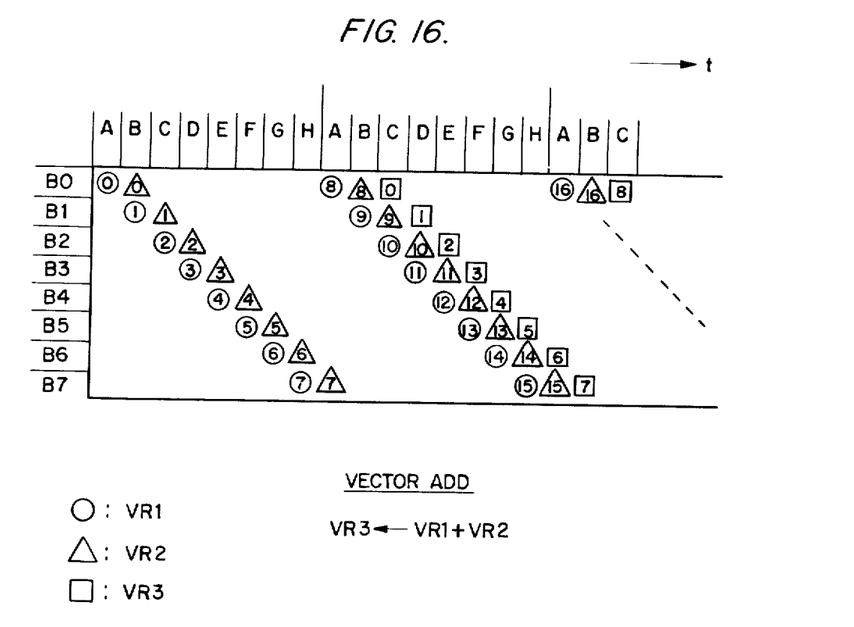
FIG. 16 illustrates the bank application timing.

FIG. 16 explains the bank application timing indicating the variation of bank access timing in the addition VR3←VR1+VR2.

As is obvious from FIG. 16, a condition exists where only three banks are occupied simultaneously at the same timing after the timing C of the 2nd cycle from the start of output of operation result. Therefore, it can be understood easily that, in the succeeding multiplication, the preceding addition and bank access can be executed smoothly without collision by starting the bank access from the timing D of the 2nd cycle.

Figure 12A:
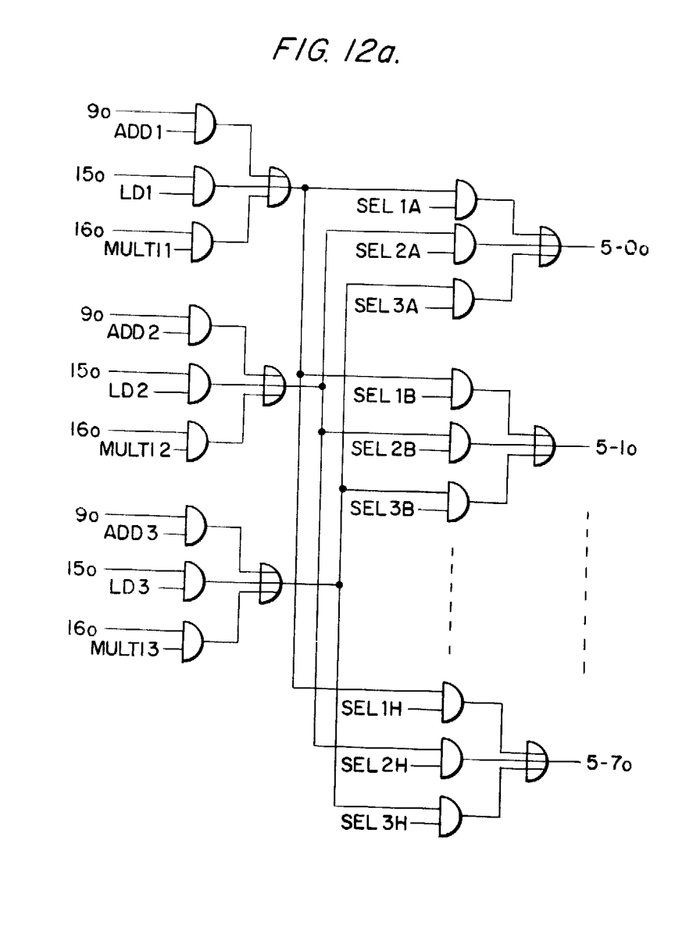
Figure 12B:
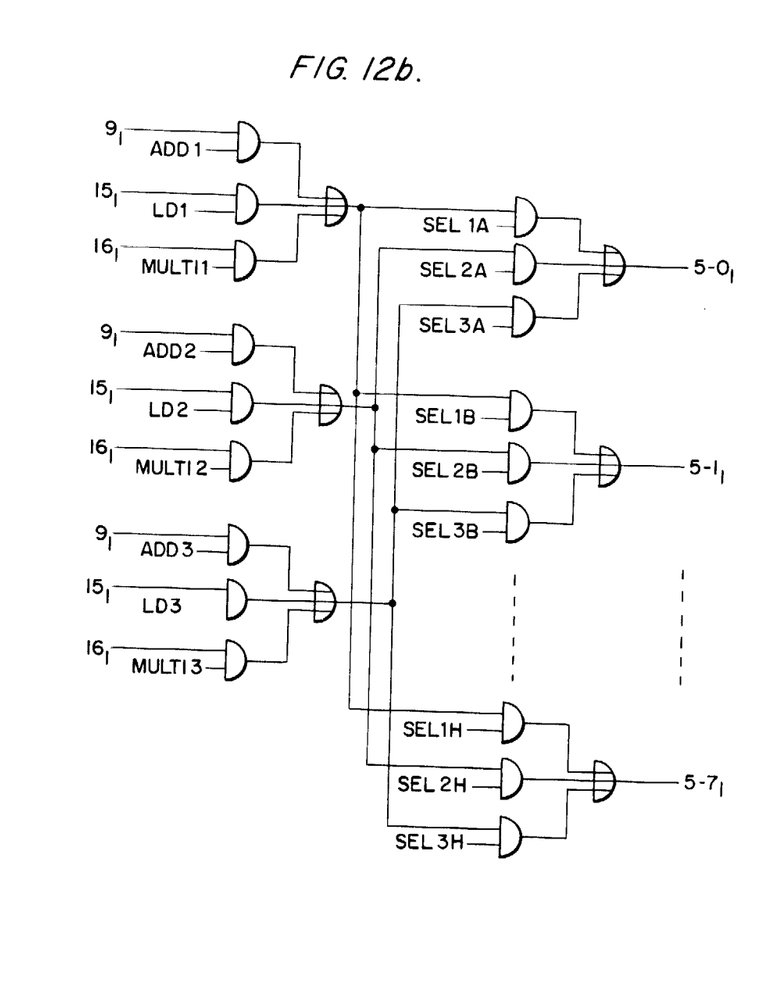

FIGS. 12 (a and b) show the detailed structure of the write gate circuit for the vector register. FIG. 12 (a) is the gate circuit for 0th bit, while FIG. 12 (b) is the gate circuit for 1st bit. The gate circuits for remaining 2nd to 63rd bits are omitted.

In FIG. 12 (a) and FIG. 12 (b), 5-0 to 5-7, 9, 15 and 16 correspond to those elements having the same numbering in FIG. 2, and the suffix 0 indicates the 0th bit, while suffix 1 indicates the 1st bit. ADD1 to ADD3, LD1 to LD3, MULTI 1 to MULTI 3, SEL1A to SEL1H, SEL2A to SEL2H and SEL3A to SEL3H indicate respectively gate control signals.

Figure 13A:
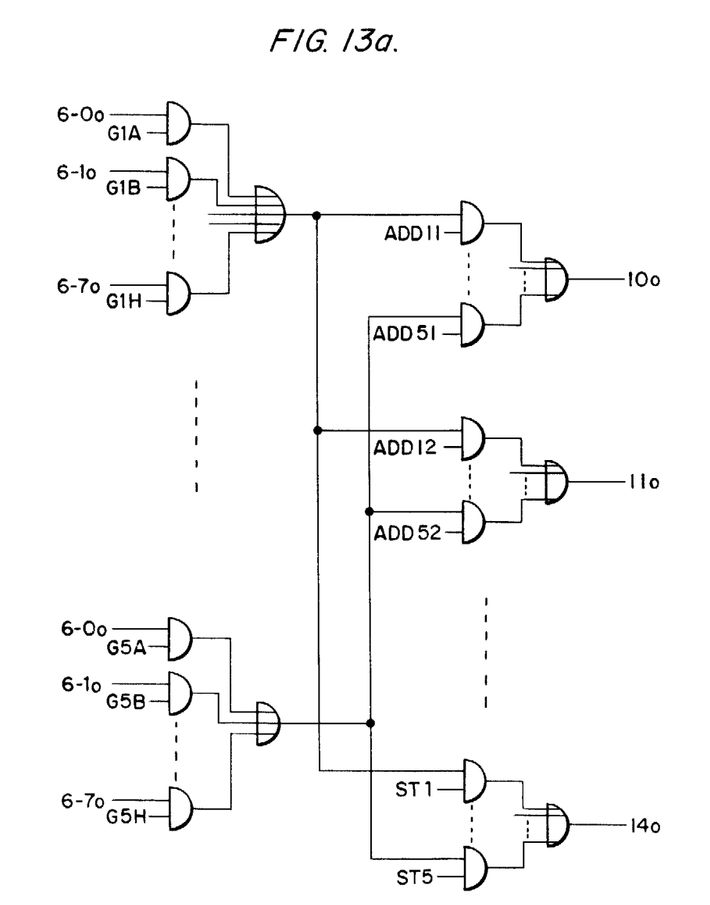
Figure 13B:
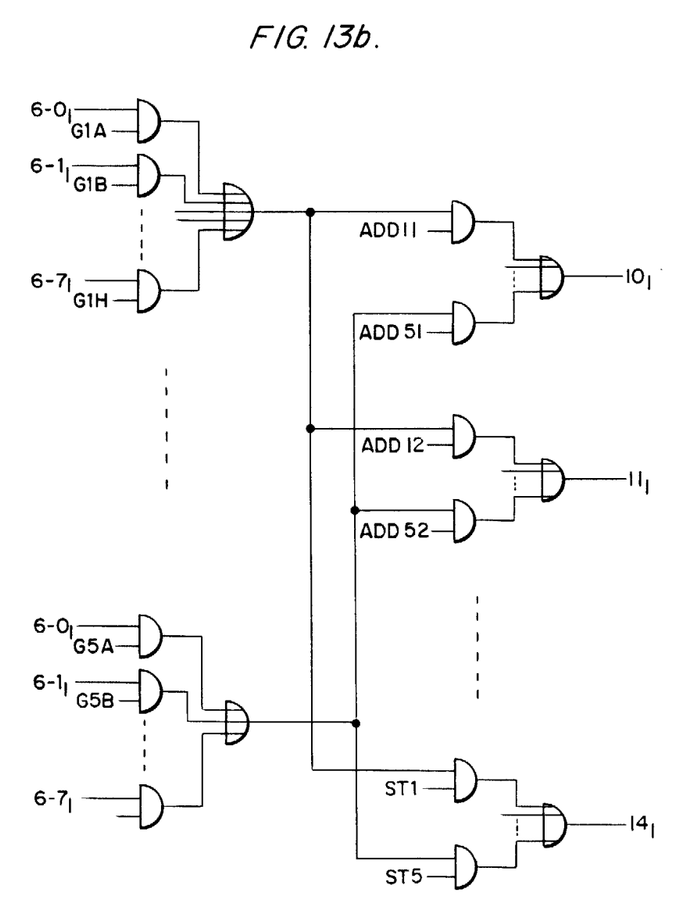

FIGS. 13 (a and b) show the detailed structure of the gate circuit for reading the data from the vector register. FIG. 13 (a) is the gate circuit for the 0th bit, while FIG. 13 (b) is the gate circuit for the 1st bit. The gate circuits for remaining 2nd to 63rd bits are omitted.

In FIG. 13 (a) and FIG. 13 (b), 6-0 to 6-7 and 10 to 14 correspond to those elements given the same numbering in FIG. 2, and the suffix 0 indicates the 0th bit, while the suffix 1 indicates the 1st bit.

G1A to G1H, ..., G5A to G5H, ADD11 to ADD51, ADD12 to ADD52, ... and ST1 to ST5 respectively indicate gate control signals.

The circuit operation of the gate circuits shown in FIG. 12 and FIG. 13 can be easily understood and therefore an operating description is omitted here.

As is obvious from the above explanation, that the present invention easily realizes the linkage operation between different kinds of logical operations in the operations using the vector registers, and that high speed operations of instructions as compared with the existing system can be realized. Thereby, in addition, the effective application coefficient of a vector registor can be raised, resulting in a highly effective data processing system.

Moreover, the present invention allows formation of a data processing system which can effectively process data sequentially for a plurality of access requests with a simplified circuit structure without requiring a complicated control circuit in order to form the access timing to the vector register.

While the present invention has been described with respect to a specific embodiment thereof, it is to be understood that the present invention is not limited thereto in any way but covers any and all changes and modifications which will become possible within the scope of the appended claims.

We claim:

1. A data processing system, having a plurality of processing classes specified by vector processing instructions, where a plurality of vector registers each comprising a plurality of elements are provided between a main memory unit and an operational unit, required data is transferred to said vector registers from the main memory unit and then held therein, and in the operational unit various processings, such as logical operations, are carried out by sequentially accessing the elements within said vector registers, said data processing system comprising:

a plurality of memory banks to which access can be made independently, respectively, and which include said vector registers, the comprised elements of each vector register, respectively, are interleaved and thus located in different memory banks, each element of each vector register is respectively associated with a number representing that element's position within its comprising vector register, and the elements of different vector registers but having the same associated number are arranged in the same memory bank; and timing generation means, operatively connected to said vector registers, for starting the access by the operation unit to a series of elements of said vector registers with a start ready timing signal which is specified for and dependent on each of the classes of processing, respectively, the processing classes being divided into an add/multiply class and a load/store class, the start ready timing signals comprise a plurality of first common timing signals which are assigned as vector register start timing signals for the add/multiply class, and a plurality of second common timing signals different from said first common timing signals and which are assigned as vector register access start timng signals for the load/store class, so that each of said vector registers operates at timing dependent on the class associated with the start ready timing signal.

2. A data processing system according to claim 1, further comprising:

an adder operatively connected to said vector registers and said timing generation means;

a multiplier operatively connected to said vector registers and said timing generation means;

a load processor operatively connected to said vector registers and said timing generation means; and a store processor operatively connected to said vector registers and said timing generation means;

said adder, said multiplier, said load processor and said store processor are provided for making continuous access to the vector registers.

3. A data processing system according to claim 2, wherein said timing generation means comprises a cyclic shift register having flip-flops of the same number as the number of said memory banks.

4. A data processing system according to claim 3, wherein said start ready timing signals comprise a plurality of timing signals generated by said timing generation means for controlling each class of processing.

5. A data processing system according to claim 4 wherein the flip-flops indicate an occupied condition one of said plurality of vector registers of said banks and are provided corresponding to said timing signals, and only when said flip-flops indicate an access start ready condition is the start of access to the memory banks allowed at the timing of the first or second common timing signals.

6. A data processing system according to claim 2, 3, 4 or 5, wherein the adder and multiplier each have one input as a 2nd operand input, another input as a 3rd operand input and an output as a 1st operand output, and the adder and multiplier exclusively occupy one of the memory banks continuously while making access to said 1st, 2nd and 3rd operands.

7. A data processing system according to claim 2, 3, 4 or 5, wherein the adder and multiplier each have one input as a 2nd operand input, another input as a 3rd operand input and an output as the 1st operand output, and the adder and multiplier occupy three memory banks at the same time while accessing said 1st, 2nd and 3rd operands.

8. A data processing system for processing add, multiply, load and store vector instructions, comprising:
a main memory unit;
a main memory control unit operatively connected to said main memory unit;
a memory control unit, operatively connected to said main memory control unit, for loading and storing in dependence upon the load and store vector instructions;
vector registers, operatively connected to said memory control unit, said vector registers being loaded by said memory control unit in dependence upon the load vector instruction and contents of said vector registers being stored in said main memory in dependence upon said store vector instruction;
an operation unit, operatively connected to said vector registers, for adding and multiplying the contents of said vector registers in dependence on the add and multiply vector instructions;
an instruction control unit, receiving said vector instructions and operatively connected to said memory control unit, said vector registers and said operation unit, for decoding the add, multiply, load and store instructions and providing control signals to said memory control unit, said vector registers and said operation unit in dependence upon the decoding; and
timing generation means, operatively connected to said instruction control unit, said memory control unit and said operation unit, for generating first vector register access timing signals for the add and multiply vector instructions and second vector register access timing signals for the load and store vector instructions.

9. A data processing system according to claim 8, wherein said memory control unit comprises loading and storing processors operatively connected to said main memory control unit, said timing generation means, said instruction control unit and said vector registers;
wherein said operation unit comprises an adder and a multiplier both operatively connected to said vector registers, said instruction control unit and said timing generation means; and
wherein said timing generation means comprises:
a shift register, operatively connectable to receive a clock signal, for generating register timing signals;
an add/multiply start-control circuit, operatively connected to said shift register, said adder and said multiplier, for generating the first vector register access timing signals and a first control signal;
a load/store start control circuit, operatively connected to said shift register, said loading processor and said storing processor, for generating the second vector register access timing signals and a second control signal;
a bank slot reserve control circuit, operatively connected to said shift register, said add/multiply start control circuit and said load/store start control circuit, for generating reserve signals in dependence upon the register timing signals and the first and second control signals; and
a selector, operatively connected to said instruction control unit, said add/multiply start control circuit and said load/store start control circuit, for generating selection signals in dependence upon the add, multiply, load and store vector instructions
the first and second vector register access timing signals being generated in dependence upon the register timing signals, the reserve signals and the selection signals.

* * * * *

UNITED STATES PATENT AND TRADEMARK OFFICE
CERTIFICATE OF CORRECTION

PATENT NO. : 4,435,765

DATED : March 6, 1984

INVENTOR(S) : KEIICHIRO UCHIDA ET AL

It is certified that error appears in the above-identified patent and that said Letters Patent is hereby corrected as shown below:

Column 1, line 24,   "arithmethic" should be --arithmetic--;
             line 30,   after "Number 1,", insert --Jan.--;
             line 45,   "an" should be --the--;
                        "the", second occurrence, should be --an--.

Column 2, line 21,   "request" should be --requests--;
             line 42,   delete "part of";
             line 61,   delete "more".

Column 3, line 63,   delete "and";
                        insert --and-- before "32";
             line 67,   delete "and";
                        before "36", insert --and--.

Column 4, line 15,   delete entire line;
             line 16,   delete entire line;
             line 17,   "of them is omitted here" should be --well-known types of arithmetic circuits which adopt a well-known pipeline architecture--;

UNITED STATES PATENT AND TRADEMARK OFFICE
CERTIFICATE OF CORRECTION

PATENT NO. : 4,435,765

DATED : March 6, 1984

INVENTOR(S) : KEIICHIRO UCHIDA ET AL

It is certified that error appears in the above-identified patent and that said Letters Patent is hereby corrected as shown below:

|  |  |  |
|---|---|---|
|  | line 19, | "pipe line" should be --pipeline--; |
|  | line 40, | delete "as". |
| Column 6, | lne 27, | "Q" should be --$\bar{Q}$--. |
| Column 7, | line 64, | "registor" should be --register--. |
| Column 8, | line 30, | after "comprising", insert --said--; |
|  | line 36, | "operation" should be --operational--; |
|  | line 47, | "timng" should be --timing--. |
| Column 10, | line 46, | after "instructions", insert --;--. |

Signed and Sealed this

Fifth Day of March 1985

[SEAL]

Attest:

DONALD J. QUIGG

Attesting Officer — Acting Commissioner of Patents and Trademarks